United States Patent [19]

Newton

[11] 4,420,854

[45] Dec. 20, 1983

[54] APPARATUS FOR CLEANING TRAYS

[76] Inventor: John Newton, 126 Church Rd., Hartshead, Liversedge, West Yorkshire, England

[21] Appl. No.: 276,652

[22] Filed: Jun. 23, 1981

[30] Foreign Application Priority Data

Jun. 28, 1980 [GB] United Kingdom ................ 8021295
Aug. 12, 1980 [GB] United Kingdom ................ 8026244
Jan. 15, 1981 [GB] United Kingdom ................ 8101237

[51] Int. Cl.³ .............................................. B08B 9/08
[52] U.S. Cl. .......................................... 15/302; 15/56; 15/306 B; 15/308; 15/316 R; 34/105; 34/229
[58] Field of Search ............... 15/56, 302, 306 B, 308, 15/316 R; 134/72, 73, 82, 83, 130, 131, 151; 34/105, 222, 229

[56] References Cited

U.S. PATENT DOCUMENTS

| 1,364,121 | 1/1921 | Leyland et al. | 34/229 |
| 1,697,879 | 1/1929 | Olson | 34/229 |
| 1,980,602 | 11/1934 | Toniatti | 15/56 X |
| 2,764,170 | 9/1956 | Messler et al. | 34/229 X |
| 2,846,704 | 8/1958 | Bella | 134/73 X |
| 3,805,316 | 4/1974 | Sheppard | 15/306 B |
| 4,044,420 | 8/1977 | Hanson | 15/306 B X |
| 4,202,071 | 5/1980 | Scharpf | 15/302 |

Primary Examiner—Chris K. Moore
Attorney, Agent, or Firm—Larson and Taylor

[57] ABSTRACT

Apparatus for drying trays with side walls such as are used in the food industry comprises a conveyor for passing the trays along a path of travel disposed along which is a drying apparatus for directing jets of air, which may be at ambient temperature, onto the tray surfaces. The drying apparatus comprises a nozzle arranged such that in its normal position its outlet is close to the base of the tray to direct air onto the base and which is displaceable from its normal position by the side walls of trays passing along the path, the nozzle returning to its normal position when out of contact with the side walls. The drying apparatus may be used alone or in combination with a tray washing apparatus comprising a tank for containing washing fluid which has a first end for receiving unwashed trays and a second end for receiving washed trays, path of travel defined for the trays through the tank, and a series of rotatable brushes arranged along the path for engaging the tray surfaces with brushing bristles so as to brush wash the tray surfaces by agitation of the washing fluid in contact therewith and simultaneously to propel the trays along the path from the first end to the second end. Alternatively the washing apparatus may be used alone.

13 Claims, 3 Drawing Figures

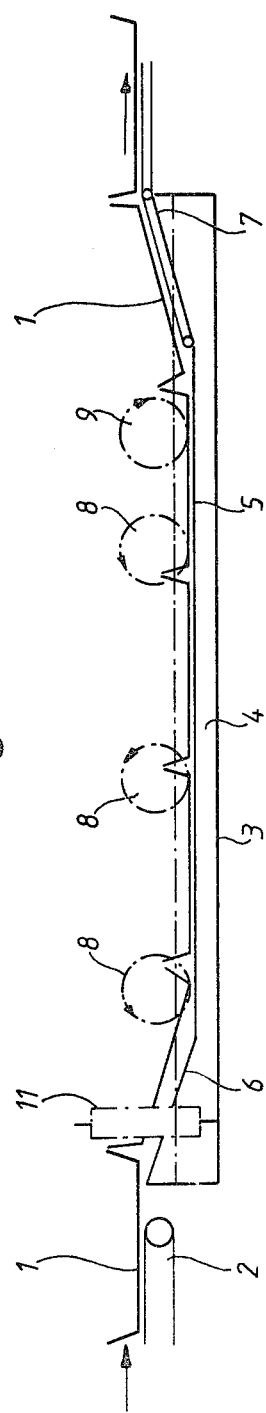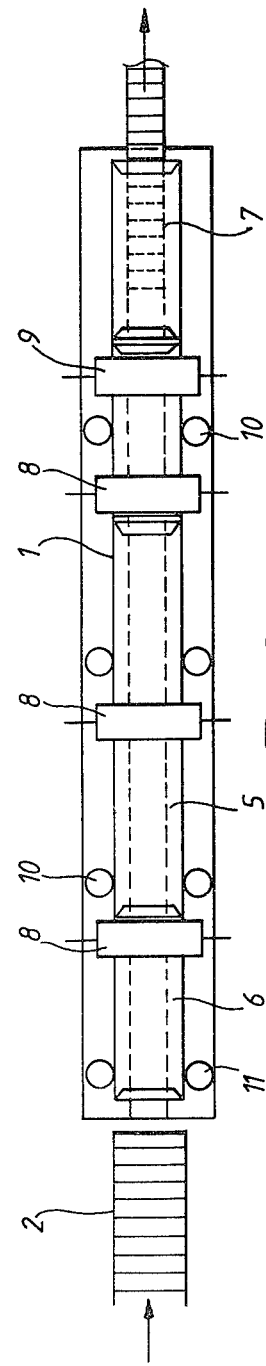

APPARATUS FOR CLEANING TRAYS

This invention relates to apparatus for cleaning trays, including washing and/or drying trays.

It is conventional in industry to carry small products about in trays, and also in certain cases to form the products in trays; for example trays for producing chocolates are substantially flat but have depressions which act as moulds. Other trays used in industry have sidewalls, that is walls extending upwardly from a generally flat tray surface. Amongst industries which particularly use trays is the food industry, in which trays are used for example for carrying loaves of bread, fish, meat, items of confectionery and other foods. Other industries which employ trays of various kinds include the electrical industry where newly manufactured electrical goods may be carried about between factory departments in trays or similar containers, and the drug industry where bottles of pharmaceuticals are conventionally transported in trays. Those trays, that is containers, which are used may have sidewalls upstanding from a generally flat base, although the sidewalls do not necessarily extend from every side of the base of the tray. The term sidewalls as used herein includes walls which extend from what would generally be considered as the front and rear ends of the tray.

From time to time it is necessary to clean these trays, which are often left after use in dirty environments and so become unhygenic; this is particularly important when the trays are used in the food industry. Hitherto, cleansing has been performed in machines which essentially comprise a conveyor belt for carrying the trays, which belt passes through a hot water washing section and then through a drying section wherein a blast of hot air is directed through fixed orifices onto the trays as they pass through the machine.

Conventional machines have the capacity to clean trays, by washing and drying them, at the rate of about 1000 per hour. In such machines the washing section generally comprises a conveyor on which the trays are carried and which passes through a series of spray jets. The first of the series usually sprays a washing fluid in the form of an aqueous detergent onto the trays, the fluid being at a temperature of about 160° to 180° F. (71°–82° C.). Subsequently a second series of jets directs recirculated fresh water onto the washed trays to rinse the same, and a third series of jets sprays completely fresh water onto the trays in order to rinse all detergent off the trays, this being important in the case of food trays.

It is a major disadvantage of the washing sections of conventional tray cleansing machines that the spray jets consume large quantities of energy. Thus because the detergent and rinsing liquids are directed in spray form, and in particular the aqueous detergent is hot, vast quantities of steam are produced which necessarily have to be extracted by means of fans. This extraction results in a high heat loss, that is a high energy consumption, this being typically of the order of 300 kw per hour. Indeed it has been calculated that the energy lost through evaporation by such machines corresponds to a temperature drop of 1 or 2 degrees F. per pound (about 1 to 2 degrees C. per kg) of water pumped through the jet spray system. Evaporation also means that there is a high consumption of washing fluid; although the fluid is conventionally recirculated, typically at rates of 300 to 500 gallons (about 1.36 to 2.27 m$^3$) per minute evaporation loss means that the fluid must be continually made up. The use of spray jets also incorporates air into the washing fluid which accordingly readily generates foams which are detrimental to the washing action of the machine.

The presence of spray jets means that anti-splash/spray curtains are required within the washing section so as to define those areas in which detergent is used from those areas in which recirculation rinsing and fresh water rinsing are carried out. A further disadvantage is that the conveyor for the trays necessarily passes through a spray of active detergent solution, and so must be of a material which is non-corrosive in that environment. The motion of the conveyor also transfers heat from the washing areas to the rinsing and drying areas, and so increases the energy consumption of the machine as a whole.

In addition it has been found that the spray jet washing techniques known hitherto are not totally satisfactory since dirt and other materials may not be completely removed. In particular, with plastics trays, dirt may be retained on the trays by electrostatic attraction. It is desirable, therefore, to provide a means for effectively washing trays and removing dirt which may cling thereto. This applies especially to trays having sidewalls, particularly at the leading and trailing ends, since it is extremely difficult to remove material from the inner surfaces of such trays. The terms leading and trailing ends are used here to mean the sidewalls which are the first and last walls of a tray to pass a predetermined point as the tray moves along a path of travel.

In the drying sections of conventional machines, vast amounts of hot air are required. Heating of the air is usually by direct gas flames, and it is usual for these gas flames to consume some 500,000 to 600,000 BTU (about 500,000 to 633,000 kJ) per hour. Accordingly, conventional machines have an extremely high energy consumption and are thus expensive to run.

A further major disadvantage associated with the drying sections of conventional tray cleansing machines is that, because the trays have upstanding sidewalls, the fixed orifices through which the hot air is directed must necessarily, certainly those disposed above the tray as it moves through the drier, be located at some distance from the base of the tray which is to be dried. For example when the orifices are disposed above the tray, the distance of the orifice from the base of the tray must be greater than the sidewall height of the tray. Accordingly, a jet of hot air directed from this distance dissipates and cools before it impinges on the base of the tray, and so has a reduced drying efficiency. Typically, the trays which are used in the food industry have a base which is some 2 ft by 3 ft (60×90 cm), and sidewalls which may be some 6 to 12 inches (15 to 30 cm) high. It follows that in conventional machines the hot air orifices must be some 6 to 12 inches (15 to 30 cm) from the base of the tray as it passes through the drying section. The trays are usually formed of a plastics material, sometimes incorporating metal parts; they may, however, be all metal or even wood.

According to one aspect of the present invention there is provided apparatus for drying trays which comprises (i) means defining a path of travel for the trays;
(ii) means for passing the trays along the path; and
(iii) drying means disposed along the path for directing jets of air onto the tray surfaces to dry the same, said drying means comprising at least one nozzle which is arranged such that in its normal position its outlet is close to the base of the tray to direct air onto the base and which is displaceable from its normal position by the sidewalls of trays passing along the path, the nozzle returning to its normal position when out of contact with the sidewalls.

By "close" as used above it is meant that the orifice of the nozzle is remote from the base by a distance which is less than the height of the sidewall.

The fact that the orifice is permitted to be considerably closer than has hitherto been the case when drying such trays means that it is not essential for the air to be hot. Thus in one embodiment of the invention the jet directed onto the trays is of cold, i.e. ambient air, and so a great saving in heating fuel costs is possible. Of course it is still possible using the apparatus of the invention to direct jets of warm or hot air onto the trays, in which case the apparatus additionally includes means for heating the air in conjunction with means for generating the air jet. However by virtue of the proximity of the nozzle orifice to the tray base it is not necessary for the air to be at a high temperature.

In a particularly preferred embodiment the air jet is directed from a plurality of nozzles arranged along the path of travel of the trays. The or each nozzle may be in the form of a pipe which pivotally depends from a support member such that it is simply bent upwards when it comes into contact with the sidewall and falls under its own weight or is urged downwardly by a spring means when the sidewall has passed by. However in a particularly preferred embodiment the nozzles are formed from a resilient material such as rubber or cloth or a resilient plastics substance, which is simply deflected by the passing sidewall and flips back into its normal position (with the orifice close to the tray base) when the sidewall has passed by.

It is envisaged that in normal operation the nozzle (s) will depend from a position above the trays as they pass along the path of travel, that is that the sidewalls, including those at the leading and trailing ends, of the trays will be upwardly extending. In this case the apparatus may additionally comprise fixed orifices disposed beneath the trays and to the side thereof in order to provide drying air jets for the bottom and outer sides of the trays. It is possible, though, for the trays to pass along the path of travel in an upsidedown configuration in which case the nozzle will be disposed so as to extend upwardly towards the inner base surface of the tray.

The means defining the path of travel of the trays may be for example slide rails, rollers or, more preferably, a conveyor. The only requirement is that the trays are caused to travel through the drying means. The trays may be driven along the path of travel by, for example the aforesaid conveyor or by driven rollers or by any other means such as brushes, a walking beam or by manual push through. In effect a train of wet (washed) trays is caused to pass in the vicinity of the air jet and thus to be dried.

In one preferred embodiment of the invention a pre-drying means is incorporated in the apparatus which serves partially to dry the trays, or at least to remove excess liquid from them, before they pass through the air jet drying means defined above. For example, the pre-drying means may comprise one or more fixed or rotatable brushes arranged adjacent the path of travel so that they brush excess liquid from the trays before they are finally dried by the air jets. This auxiliary pre-drying means serves to make the air jet drying means more efficient since the air jet is not then required to remove such large quantities of liquid from each tray.

Another form of pre-drying means which may be incorporated in the apparatus, instead of or as well as the pre-drying brushes mentioned above, comprises a member having fixed orifices which is disposed adjacent the path of travel in a position which is prior to the drying means as the trays pass through the apparatus. Such a member may be termed an air knife. The orifices form the outlets for one or more fans which produce jets of air which are directed at high speed, necessarily from some distance, onto the wet tray surfaces. This blast of air serves effectively to remove excess liquid carried on the trays by blowing off the liquid in droplet form. Thus this pre-drying means functions in a somewhat different way from the drying means itself, in which the jets of air are directed from nozzles which are generally much closer to the tray surfaces. These nozzle jets impinge on the already pre-dried trays and remove any remaining liquid by a process which is more akin to evaporation than the more mechanical way of the pre-drying stage.

It is possible for more than one train of trays to be dried at the same time, in which case there will be more than one path of travel. For example 2 or 3 trains of trays may travel through the apparatus simultaneously. The or each train of trays will be wet and will have come from a washing machine, optionally via a pre-drying means. Thus the apparatus of the invention may be a part of a combined washing and drying machine; alternatively it may be adapted for coupling to or for use in conjunction with a separate washing machine.

In the preferred embodiment where a plurality of nozzles is used to direct the air jets onto the trays, the nozzles may be arranged, for example, in rows of three, the rows preferably being transverse to the direction of travel of the trays, with each row being approximately 2 ft (60 cm) distant from its neighbouring row. There may be, for example, eight rows of nozzles in the apparatus. It has been found that by using apparatus of this specification and using fans to blast a cold air jet through the drying means at a rate of 4,000 cu. ft (about 113 m$^3$) per min. then exposure to a cold (ambient) air jet for half a minute will give complete drying of trays passing through at a rate of 1000 per hour. The dimensions and operating conditions of the apparatus may obviously be adjusted to allow for any particular rate of travel of trays.

It will be seen that by using the apparatus of the invention in which the air jet is cold (ambient), the only energy input required will be that for driving the trays along the path of travel, and that for generating the air jet flow. Typically, the air flow is generated by one or more fans driven by one or more motors of 7½ hp. (about 5.6 kW).

It will be appreciated that the apparatus of this aspect of the invention may be used to dry trays which do not have an upstanding sidewall. In this case, the nozzles are not displaced by the trays as they pass along the path of travel; the orifices of the nozzles can, though, be disposed extremely close to the upper surface of the tray and so can permit drying with low temperature or cold (ambient) air. This means that flat trays, such as those used as chocolate moulds, can be passed through apparatus which is primarily designed for drying trays with sidewalls.

According to another aspect of the present invention there is provided apparatus for washing trays which comprises:
  (i) a tank for containing washing fluid, which tank has a first end for receiving unwashed trays and a second end for receiving washed trays;
  (ii) means defining a path of travel for the trays through the tank; and
  (iii) a series of rotatable brushes arranged along the path for engaging the tray surface with brushing bristles so as to brush wash the tray surfaces by agitation of the washing fluid in contact therewith and simultaneously to propel the trays along the path from the first end to the second end.

Trays which may be washed in the apparatus of the invention are usually made of a plastics material although they may incorporate metal parts or may be entirely of metal, or even wood. Where required, the washing fluid may have a rust inhibitor included. Trays with side walls typically have a base which is some 2 ft. by 3 ft. (60 to 90 cm) and sidewalls which are some 6 to 12 inches (15 to 30 cm) high.

As with the dryer, it is possible to have more than one train of trays passing through the tank at the same time; for example the trays may pass through the tank in double or triple lane arrays.

After removal from the tank, the washed trays may be rinsed and further brushed to remove electrostatically attracted dirt. The trays may then be passed to a drying zone. Thus the apparatus of the invention may be a part of a combined washing and drying machine; alternatively it may be adapted for coupling to or for use in conjunction with a separate drying machine.

The means defining the path of travel for the trays through the tank may simply be constituted by the bottom of the tank. However it is preferred to have a pair of slide rails upon which each tray travels. As mentioned above, there may be one, two or even more paths through the tank, so that one or more trains of trays can pass through at the same time. Of course the tank dimensions are the limiting feature of this embodiment. If the trays are of a material which tends to float in the washing fluid, then the apparatus may additionally include a sinker means for partially immersing the trays in the fluid. For example a chain or conveyor belt may pass through the tank in a position which is above the trays, but arranged so as to sag downwards onto the trays so forcing them into the washing fluid. Generally, though, the trays will simply pass along the slide rails, travelling through the washing fluid as they do. It is preferred to maintain the washing fluid level so that it is about 1 inch (2.5 cm) above the upper surface of the slide rails so that the trays pass through the fluid but are not immersed therein. This facilitates pick up of the fluid by the brushes and hence helps the washing procedure.

The washing fluid may be for example an aqueous cleaning fluid such as a dilute alkaline detergent. Preferably the fluid is maintained at an elevated temperature, for example 90° F. (32° C.). It will be appreciated that the materials used in the construction of the apparatus must be compatible with the fluid which is used. For example the tank may be of stainless steel, and moving parts may be of stainless steel or a plastics material such as teflon (polytetrafluoroethylene).

Dirty trays which are to be washed may be delivered to the first end of the tank by hand. In a preferred embodiment, though, a conveyor is provided to deliver the dirty trays to the first end of the tank. It is preferred that this first end is in the form of a ramp to facilitate delivery; for example the ramp may be constituted by the slide rails extending upwardly from the bottom of the tank at an appropriate angle. It is preferred to provide a conveyor at the second end of the tank to facilitate removal of washed trays therefrom.

The apparatus of the invention may be used to wash for example in the order of 1000 trays per hour per path of travel. Delivery of the trays to the tank may be indexed for example by a rotatable delivery indexing means such as a half brush arranged at the first end of the tank and driven by a dc motor. Appropriate coding of the motor will cause the indexing means (half brush) to rotate from a first position whereat it (the bristles) holds back a tray which is at the first end of the tank to a second position whereat the indexing means (half brush) does not contact the tray and hence permits delivery of the tray to the bottom of the tank. Such an arrangement also permits ready counting of the tray throughput. A similar removal indexing means such as a half brush may be provided at the second end of the tray to index the removal of washed trays, preferably for transfer to a drying machine. Alternatively the output of washed trays may be delivered to a conveyor to provide transport to the drying means. Indexing of the output of the washing apparatus is advantageous since it permits positioning of washed trays in a manner which is most effective for removal of excess water by the drying means.

In use of the apparatus the brushes which are arranged along the path of travel of the trays rotate and the bristles come into contact in particular with the tray inner surfaces. The brushing action of the bristles, in combination with the washing fluid which is present, causes the surfaces to be cleaned and any solid particles of dirt to be sent to the bottom of the tank. It is preferred for the brushes to have floppy bristles, for example formed from a suitable plastics material, and to be of such a length that the bristles extend into every part of the trays. The bristles may be, for example 2 ft (60 cm) in length and may be similar to those brushes which are generally used in conventional automatic car wash machines.

The direction of rotation of the brushes is such that the bristles impinging on the tray surfaces serve to propel the trays along the path of travel. Preferably each brush is arranged transversely to the path of travel, and above the trays as they move along the same. For example the brushes may each be powered by one half hp motor, and typically rotate at 60 rpm. It is preferred to have a series comprising three brushes which serve to brush wash the trays and to propel them at the same time.

In a preferred embodiment one or more other brushes are arranged along the path of travel, these brushes counter rotating against the flow of the trays. These serve to provide an additional brushing, particularly against those surfaces which are not completely brushed by the propelling brushes. For example when three propelling brushes are included in the apparatus, there may be a single counter rotating brush, preferably at the second end of the tank.

In general the inner surfaces and leading and trailing outer surfaces of the trays are brush washed by those rotating brushes described above. It is preferred also to include other brushes which are disposed along the path of travel and are arranged so as to clean the outer sidewalls and/or bottom of the trays. These brushes may be relatively stiff bristled, and may rotate in use or be stationary. It is preferred to include a pair of such outer brushes at the second end of the tank to assist removal of the washed trays from the tank, or at least to assist transfer from the rails to the conveyor.

In a particularly preferred embodiment the above mentioned indexing means are not included; rather there is provided at the first end of the tank, for each path of travel, a pair of rotatable brushes at opposite sides of the path. In use, the brushes which are disposed substantially normal to the bottom of the tank, rotate with their bristles in contact with the sides of the trays and the direction of rotation is such as to push the tray along the path of travel through the tank. The rotation of the actual cleaning brushes within the tank also serves to push the trays along, and a train of trays builds up in the tank, one tray following after the other. The counter rotating brush at the second end tends to push against the flow of trays, and so it is ensured that no gaps build up between trays in the tank. This has two advantageous effects, first that the bristles are always in contact with a tray, and second that every dirty tray introduced at the first end results in the removal of a washed tray from the second end, thus permitting ready indexing of the system. When the conveyor of the washing apparatus also comprises the path of travel through a coupled drying apparatus, this also means that the train of trays passes continuously through the dryer, and hence that the air jets are always directed at a tray rather than at a space between trays. In particular if the supply of trays to the first end of the washer tank is interrupted, the counter rotating brush tends to hold back the trays in the tank, and the nozzles of the drying means tend to hold back the trays in the drying means.

It is particularly preferred that the first and second aspects of the invention are used in combination to constitute a tray washing and drying machine. Accordingly yet another aspect of the invention comprises a machine for washing and drying trays which comprises (a) a washing section comprising (i) a tank for containing washing fluid, which tank has a first end for receiving unwashed trays and a second end for receiving washed trays; (ii) means defining a path of travel for the trays through the tank; and (iii) a series of rotatable brushes arranged along the path for engaging the tray surfaces with brushing bristles so as to brush wash the tray surfaces by agitation of the washing fluid in contact therewith and simultaneously to propel the trays along the path from the first end to the second end; and (b) a drying section comprising (iv) another means defining a path of travel for the trays which extends from the second end of the tank; (v) means for passing the trays along the path; and (vi) drying means disposed along the path for directing jets of air onto the tray surfaces to dry the same, said drying means comprising at least one nozzle which is arranged such that in its normal position its outlet is close to the base of the tray to direct air onto the base and which is displaceable from its normal position by the sidewalls of trays passing along the path, the nozzle returning to its normal position when out of contact with the sidewalls.

The preferred features of this aspect of the invention correspond to those features particularly described above with regard to the washing apparatus and drying apparatus respectively. Of course the action of the brushes in the washing section will assist delivery of the trays from the tank into the drying section, which particularly preferably delivers cold (ambient) air to the tray surfaces to be dried. It is also particularly preferred that the above-mentioned pre-drying means is incorporated in the machine being disposed on said other path defining means between the tank and the drying means.

For a better understanding of the invention and to show how the same may be carried into effect, reference will now be made by way of example to the accompanying drawings in which:

FIG. 1 is a schematic longitudinal cross section through one embodiment of the washing apparatus according to the invention;

FIG. 2 is a schematic plan view of the embodiment of FIG. 1; and

Figure 3:
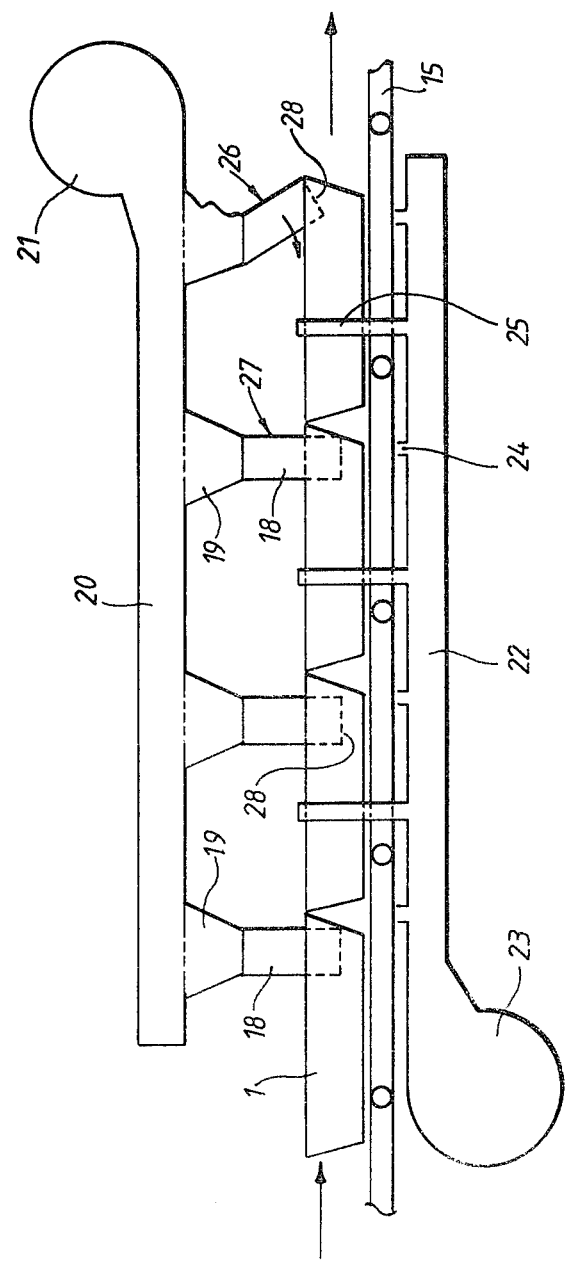
FIG. 3 is a side elevation of one embodiment of the drying apparatus according to the invention, which may if required be used in combination with the washing apparatus of FIGS. 1 and 2 to constitute a washing and drying machine.

In use of the embodiment shown in FIGS. 1 and 2, a train of trays 1 is delivered by a conveyor belt 2 to a tank 3 containing washing fluid 4, the surface of which is indicated by a dot-dash line. The tank includes a pair of guide rails 5 which generally extend along the bottom of the tank about an inch (2.5 cm) below the surface of the washing fluid; these extend upwardly at the first end of the tank so as to form a ramp 6. At the second end is a live conveyor 7 running from the rails 5 over the rim 2 of the tank. Mounted on the tank for rotation are three brushes 8 which serve to brush wash the trays as they pass along the slide rails and also to propel them along said rails. Also mounted for rotation in the tank is a counter rotating brush 9. The axes of rotation of the brushes 8 and 9 are transverse to the direction of travel of the trays, the actual direction in which the bristles of the brushes rotate being indicated by appropriate arrows. As they pass along the slide rails, each tray is subjected to a pushing movement by the brushes 8, and also at the same time to a brush washing action as the bristles flip round. The counter-rotating brushes 9 brush wash those surfaces which are not completely cleaned by the bristles of brushes 8. In the embodiment shown the brushes 8 and 9 clean the inner surfaces of the trays and the outer surfaces of the leading and trailing edges.

As may be seen from FIG. 2 in which for clarity the end trays of FIG. 1 are not shown, brushes 10 are provided within the tank which are positioned so as to clean the outer surfaces of the trays as they pass through. These brushes are relatively stiff bristled and may be stationary or caused to rotate. For clarity, the drive means of the various brushes used in the apparatus have not been shown.

Delivery of an unwashed tray to the apparatus is governed by means of a pair of rotatable brushes 11 disposed at the first end of the tank 3 in a substantially normal axis to the bottom of the tank. The rotating bristles of the brushes 11 grip the tray and push it into the tank in contact with preceding trays as described hereinbefore. Further brushes, not shown, may be arranged in the bottom of the tank so as to clean the bottom surface of the trays as they move along the slide rails 5.

Referring to FIG. 3 there is shown a drying apparatus which may be used in combination with the washer described above if desired. Thus FIG. 3 shows a train of trays 1 passing along a path of travel in the form of a conveyor 15 which may, when the dryer is used in combination with the washer, constitute an extension of the conveyor 7 at the second end of the washer tank. It is preferred that spray means, not shown, is disposed between the dryer and the second end of the tank to spray jets of clean water onto the trays so as to rinse detergent therefrom. It is also preferred that an air knife, as mentioned above, is disposed on the path of travel after the rinsing section. Along the path of travel is the drying means comprising a series of displaceable nozzles 18 which, in the embodiment shown are displaced by virtue of being coupled to a resilient material 19, formed for example from rubber or cloth or a resilient plastics substance. The resilient material is itself coupled to an air duct 20 through which air is pumped from a fan 21 to pass through the nozzles and dry the inner surfaces of the trays. One of the nozzles 18 is shown in its displaced position 26, just about to flip back into its normal position 27, at which normal position the nozzle outlet or orifice 28 is close to the tray base. Beneath the train of trays is provided a second air duct 22 through which air is pumped from a second fan 23. The air duct 22 is provided with orifices 24 such as to direct air onto the bottom outer surface of the trays, and with pipes 25 which are upstanding along the path of travel and are provided with orifices so as to direct air onto the outer sidewalls of the trays. The air which is used in this system may be warmed, but by virtue of the displaceable nozzles it is entirely possible and economically desirable to dry the surfaces of the trays with a jet of cold (ambient) air since the jet is delivered at a position very close to the tray surface despite the tray having one or more sidewalls.

I claim:

1. Apparatus for drying trays having upstanding side walls and comprising means defining a path of travel for the trays, means for passing the trays along said path, and drying means disposed along said path for directing jets of air onto the tray surfaces to dry the latter, said drying means comprising a plurality of depending air nozzles arranged along said path of travel and each having an outlet at the lower end thereof for directing the jet of drying air towards the surfaces of trays as the trays move along said path, and mounting means for mounting each air nozzle in relation to the said path of travel so as to be displaceable between a drying position in which the respective outlet is located inside of a tray close to the base of the tray and below the upper edge of the side wall of the tray, and a displaced position in which the nozzle does not impede the travel of the tray along said path, and such that each nozzle is displaceable from its drying position by engagement therewith of the side wall of one of said trays as that tray moves along said path, and is thereafter returnable automatically to the drying position when no longer engaged by the side wall of the tray.

2. Apparatus according to claim 1, wherein said mounting means comprises a resilient material which supports the nozzle and which permits deflection of the nozzle by the side wall of a tray as that tray passes along said path.

3. Apparatus according to claim 1, in which the nozzle comprises a pipe and said mounting means pivotally mounts said pipe in relation with respect to a support member.

4. Apparatus according to claim 3, in which the pipe is coupled to the support member by resilient material.

5. Apparatus according to claim 3, in which the pipe is coupled to the support member by material comprising cloth.

6. Apparatus according to claim 1, including a member having fixed orifices arranged along the path of travel for directing jets of air onto the external surfaces of the tray to remove liquid therefrom.

7. Apparatus for washing trays having upstanding side walls and comprising a tank for containing washing fluid, means defining a path of travel for the trays through the tank, in relation to the intended liquid level, such that the bases of the trays are immersed in liquid to a shallow depth as the trays move through the tank, and a series of rotatable brushes arranged along said path and mounted for rotation in the apparatus about horizontal axes extending transversely of said path and above the maximum height of the tray side walls, each said brush comprising a floppy brush extending transversely of said path and having floppy filaments extending radially from said axis, said filaments serving to brush-wash the tray surfaces, upon rotation of the brush, by agitation of the washing fluid in contact therewith, and simultaneously to propel the trays along said path, and said filaments being sufficiently floppy to yield upon engagement with the tray walls so as not to impede the brush-washing and propelling action imparted to the trays by the brush.

8. Apparatus according to claim 7, which includes at least one counter-rotatable brush arranged to rotate in contact with the trays in a sense opposite to that of said rotatable brushes.

9. Apparatus according to claim 7, which includes at least one additional brush arranged along the path of travel for contacting the outer surfaces of passing trays to brush the same.

10. Apparatus according to claim 9, wherein said at least one additional brush is stationary.

11. Apparatus according to claim 9, wherein said at least one additional brush is rotatable.

12. Apparatus according to claim 7, wherein a pair of rotatable brushes is arranged at one end of the tank at opposite sides of the path of travel such that, in use, said brushes rotate in contact with the sides of the trays to assist delivery thereof into the tank.

13. Apparatus for washing and drying trays having upstanding side walls and comprising washing means comprising a tank for containing a washing fluid, means defining a path of travel for the trays through the tank in relationship to the intended liquid level within the tank such that the bases of the trays are immersed in liquid to a shallow depth as the trays move through the tank, and a series of rotatable brushes arranged along the path of travel through the tank and mounted for rotation about horizontal axis extending transversely to said path of travel through the tank and above the maximum height of the side walls, each said brush comprising a floppy brush extending transversely to said path of travel through the tank and having floppy filaments extending radially from said axis, said filaments serving to brush-wash the tray surfaces, upon rotation of the brush, by agitation of the washing fluid in contact therewith, and simultaneously to propel the trays along said path through said tank, and said filaments being sufficiently floppy to yield upon engagement with the tray walls so as not to impede the brush-washing and propelling action imparted to the trays by the brush, said apparatus further comprising means defining a further path of travel for the trays, means for passing the trays along said further path of travel and drying means disposed along the further path of travel for the trays for directing jets air onto the tray surfaces to dry the latter, said drying means comprising a plurality of depending air nozzles arranged along said further path of travel and each having and outlet at the lower endthereof for directing the jet of drying air toward the surfaces of the trays as the trays move along said further path of travel for the trays, and mounting means for mounting each air nozzle in relationship to the further path of travel for the trays so as to be displaceable between a drying position in which the respective outlet is located inside of a tray close to the base of the tray and below the upper edge of the side wall of the tray, in below the upper edge of the side wall of the tray, in a displaced position in which the nozzle does not impede the travel of the tray along said path, and such that each nozzle is displaceable from its drying position by engagement therewith of the side wall of one of the trays as that tray moves along said further path of travel for trays, and is thereafter returnable automatically to the drying position when no longer engaged by the side wall of the tray.

* * * * *